(12) United States Patent
Abeloe

(10) Patent No.: US 8,243,334 B2
(45) Date of Patent: Aug. 14, 2012

(54) METHODS AND APPARATUSES FOR PRINTING THREE DIMENSIONAL IMAGES

(75) Inventor: Kenneth A. Abeloe, Carlsbad, CA (US)

(73) Assignee: Virginia Venture Industries, LLC, Centreville, VA (US)

( * ) Notice: Subject to any disclaimer, the term of this patent is extended or adjusted under 35 U.S.C. 154(b) by 602 days.

(21) Appl. No.: 12/479,644

(22) Filed: Jun. 5, 2009

(65) Prior Publication Data

US 2009/0303507 A1 Dec. 10, 2009

Related U.S. Application Data

(60) Provisional application No. 61/059,575, filed on Jun. 6, 2008.

(51) Int. Cl.
*H04N 1/40* (2006.01)
(52) U.S. Cl. .......................................... 358/2.1; 382/131
(58) Field of Classification Search .................. 358/1.9, 358/2.1, 468; 382/131; 345/419–424
See application file for complete search history.

(56) References Cited

U.S. PATENT DOCUMENTS

| | | | |
|---|---|---|---|
| 4,630,203 A | 12/1986 | Szirtes | |
| 4,668,915 A | 5/1987 | Daubin et al. | |
| 4,710,876 A | 12/1987 | Cline et al. | |
| 4,719,585 A | 1/1988 | Cline et al. | |
| 4,729,098 A | 3/1988 | Cline et al. | |
| 4,737,921 A | 4/1988 | Goldwasser et al. | |
| 4,751,643 A | 6/1988 | Lorensen et al. | |
| 4,791,567 A | 12/1988 | Cline et al. | |
| 4,821,213 A | 4/1989 | Cline et al. | |
| 4,831,528 A | 5/1989 | Crawford et al. | |
| 4,879,668 A | 11/1989 | Cline et al. | |
| 4,984,157 A | 1/1991 | Cline et al. | |
| 4,985,834 A | 1/1991 | Cline et al. | |
| 5,038,302 A | 8/1991 | Kaufman | |
| 5,056,020 A | 10/1991 | Feldman et al. | |
| 5,127,037 A | 6/1992 | Bynum | |
| 5,148,366 A | 9/1992 | Buchanan et al. | |
| 5,166,876 A | 11/1992 | Cline et al. | |
| 5,170,347 A | 12/1992 | Tuy et al. | |
| 5,187,658 A | 2/1993 | Cline et al. | |
| 5,204,625 A | 4/1993 | Cline et al. | |
| 5,229,935 A | 7/1993 | Yamagishi et al. | |
| 5,235,510 A | 8/1993 | Yamada et al. | |
| 5,265,012 A | 11/1993 | Amans et al. | |
| 5,267,155 A | 11/1993 | Buchanan | |
| 5,270,926 A | 12/1993 | Tam | |
| 5,283,837 A | 2/1994 | Wood | |
| 5,295,488 A | 3/1994 | Lloyd et al. | |
| 5,313,567 A | 5/1994 | Civanlar et al. | |
| 5,339,812 A | 8/1994 | Hardy et al. | |

(Continued)

OTHER PUBLICATIONS

Anderson, Alun, A Whole New Dimension, The World in 2008, The Economist, Mar. 2008, p. 150.

(Continued)

*Primary Examiner* — Thomas D Lee
*Assistant Examiner* — Stephen M Brinich
(74) *Attorney, Agent, or Firm* — Knobbe, Martens, Olson & Bear

(57) ABSTRACT

Systems and methods for printing a 3D object on a three-dimensional (3D) printer are described. The methods semi-automatically or automatically delineate an item in an image, receive a 3D model of the item, matches said item to said 3D model, and send the matched 3D model to a 3D printer.

18 Claims, 8 Drawing Sheets

U.S. PATENT DOCUMENTS

| | | | |
|---|---|---|---|
| 5,345,490 | A | 9/1994 | Finnigan et al. |
| 5,365,927 | A | 11/1994 | Roemer et al. |
| 5,412,563 | A | 5/1995 | Cline et al. |
| 5,412,763 | A | 5/1995 | Knoplioch et al. |
| 5,437,278 | A | 8/1995 | Wilk |
| 5,517,602 | A | 5/1996 | Natarajan |
| 5,581,671 | A | 12/1996 | Goto et al. |
| 5,608,849 | A | 3/1997 | King, Jr. |
| 5,630,034 | A | 5/1997 | Oikawa et al. |
| 5,742,291 | A | 4/1998 | Palm |
| 5,762,608 | A | 6/1998 | Warne et al. |
| 5,779,634 | A | 7/1998 | Ema et al. |
| 5,782,762 | A | 7/1998 | Vining |
| 5,825,908 | A | 10/1998 | Pieper et al. |
| 5,891,030 | A | 4/1999 | Johnson et al. |
| 5,898,793 | A | 4/1999 | Karron et al. |
| 5,957,138 | A | 9/1999 | Lin et al. |
| 5,971,767 | A | 10/1999 | Kaufman et al. |
| 5,986,662 | A | 11/1999 | Argiro et al. |
| 6,083,162 | A | 7/2000 | Vining |
| 6,246,784 | B1 | 6/2001 | Summers et al. |
| 6,272,366 | B1 | 8/2001 | Vining |
| 6,694,163 | B1 | 2/2004 | Vining |
| 6,813,373 | B1 | 11/2004 | Suri et al. |
| 6,856,314 | B2 | 2/2005 | Ng |
| 6,909,913 | B2 | 6/2005 | Vining |
| 7,747,055 | B1 * | 6/2010 | Vining et al. ............ 382/131 |
| 2006/0023966 | A1 | 2/2006 | Vining |

OTHER PUBLICATIONS

Baumberg, Adam, Blending images for texturing 3D models, Canon Research Centre Europe, British Machine Vision Conference (BMVC) 2002, pp. 404-413.

Blake, Andrew, Active Contours: The Application of Techniques from Graphics, Vision, Control Theory and Statistics to Visual Tracking of Shapes in Motion (ISBN-10: 3540762175), 1998, Chapters 2.1-2.3 and 6.1, pp. 26-37; 116-120, Cambridge University Press, Cambridge, England.

DXF Reference Guide for AutoCAD 2009, AutoDesk website, http://usa.autodesk.com/adsk/servlet/item?siteID=123112& id=12272454& linkID=10809853, Jan. 2008, 296 pages.

Faux, I.D., et al., Computational Geometry for Design and Mfg (ISBN:047026473X), 1979, Chapters 6, 7, and 8, pp. 153-256, Halsted Press, New York, NY.

Foley, J., et al., Fundamentals of Interactive Computer Graphics (ISBN:0-201-14468-9), 1982, Chapter 9, pp. 319-387, Addison-Wesley Longman Publishing Co., Inc., Boston, MA.

Guth, Robert, How 3-D Printing Figures to Turn Web Worlds Real, The Wall Street Journal Online, Dec. 12, 2007, http://online.wsj.com/article/SB119742129566522283.html, 2 pages.

Leymarie, F., et al, Tracking and Describing Deformable Objects Using Active Contour Models, IEEE Transactions on Pattern Analysis and Machine Intelligence, 1993, vol. 15, Issue 6, pp. 617-634, website, http://portal.acm.org/citation.cfm?id=628302.628489.

Lam, K.-M., et al., Fast greedy algorithm for active contours, Electronics Letters, 1994, vol. 30, No. 1, pp. 21-23.

Lan, Leu-Shing, et al., Fast Approximate Karhunen-Loeve Transform with Applications to Digital Image Coding, University of Southern California, Proc SPIE, 1993, vol. 2094, pp. 444-455, SPIE Digital Library, website, http://spiedl.aip.org/getabs/servlet/GetabsServlet?prog=normal&id.

* cited by examiner

METHODS AND APPARATUSES FOR PRINTING THREE DIMENSIONAL IMAGES

RELATED APPLICATIONS

This application claims the benefit of U.S. Provisional No. 61/059,575, filed Jun. 6, 2008, which is incorporated by reference herein in its entirety.

BACKGROUND

1. Field of the Invention

This invention relates to various methods and apparatuses for printing three-dimensional objects in three-dimensional printers using three-dimensional mathematical/numerical representations of the three-dimensional objects.

2. Description of the Related Technology

Presently, three-dimensional (3D) printers are available to consumers. For instance, Automated Creation Technology sells models such as the Fab@Home 3D Production Platform. These 3D printers "print" 3D objects by spraying paper particles to form a 3D shape, curing it by heat and then coloring the surface of the cured printed object. Such 3D printers receive a 3D model (i.e., a mathematical and/or numerical representation of a 3D object) and print the object being represented by the received 3D model.

An example of 3D printing is described in "*A Whole New Dimension*," Alun Anderson from The World 2008 and "*How 3-D Printing Figures To Turn Web Worlds Real*," Robert Guth, Wall Street Journal, Dec. 12, 2007, Page B1.

However, the generation of 3D models is a rather cumbersome technology that does not allow 3D models to be readily generated. Typically, the generation of 3D models would require highly sophisticated users and/or stereographic machines. Moreover, most 3D representations do not represent an item in action or posed containing background attributes found in either a fictional or non-fictional setting. In other words, for a wider use of 3D printers, techniques to generate easily 3D models are desired.

An example for generating a 3D model is described in the following reference, "*Computational Geometry for Design and Mfg*," Faux, I. D., Pratt, M. J., 1979 and "*Fundamentals of Interactive Computer Graphics*," Foley J., vanDam, A., 1982.

SUMMARY OF CERTAIN EMBODIMENTS

Accordingly, apparatuses and methods for printing a 3D object on a 3D printer are described. In some embodiments, the methods may include semi-automatically or automatically delineating an item in an image, wherein the item is selected by a user, receiving a 3D model of said item, matching said item to said 3D model, and sending said matched 3D model to a 3D printer.

In some embodiments, a method of printing a 3D object in a 3D printer can include the steps of selecting a point in an object of interest in an image, automatically delineating the object of interest in the image, and selecting a wire-frame 3D model of the object of interest, wherein the wire-frame 3D model may include shape information of the object of interest. Such embodiments can also include the steps of mapping information from a portion of image representing said delineated object with the selected wire-frame 3D model, and transmitting the mapped information to the 3D printer to be printed. In one example, the mapped information is a 3D model for printing the object of interest as a raised-contoured surface. There can also be more than one raised-contoured surface. In another example, the mapped information is a 3D model for printing said object of interest as a freestanding figurine on a platform. The object of interest can be an image of a person or persons, an animal, a figure, or any other object depicted in an image.

In one example embodiment, the 3D wire-frame model can be automatically calculated from stereoscopic set of images. In another example, the 3D wire-frame model is pre-generated and stored in a database with a copyright protection.

The mapping step mentioned above can further include the steps of breaking the 3D wire-frame model into 3D components, determining the position of the 3D components in relation with respect to the image representing said delineated object, and coloring the 3D components with the color information from the image representing said delineated object.

Examples of certain embodiments of apparatuses that may be used to implement one or more aspects of the invention, including performing the above-described methods are illustrated and described hereinbelow, for example, in FIGS. 1, 2, 5, and 6-8. In some embodiments, a system is configured to semi-automatically or automatically delineate a user-selected item in an image, receive a 3D model of the item, match the item to the 3D model, and send the matched 3D model to a 3D printer. In some embodiments a system for printing three dimensional images includes an input information processor, an object model processor, a multiple frame abstraction processor, an object abstraction processor, and an object formation processor. Such a system can be configured to receive broadcast/communication signals and associated information, calculate a 3D model based received wire-based model data, and calculate a 3D model based on the video capture frames, delineate an object of interest in the video frames that will be used to generate the printable 3D model, generate a data file in a format readable for 3D printers, and send the data file to the 3D printer.

An example system for printing three dimensional images may include an input information processor configured to receive a plurality of video frames and information relating to a selection of a point in an object of interest in said plurality of video frames, an object model processor configured to receive a wire-frame 3D model of the object of interest, wherein the wire-frame 3D model includes shape information of the object of interest, an object abstraction processor configured to automatically delineate the object of interest, and an object formation processor configured to map information from a portion of image representing said delineated object with the selected wire-frame 3D model and configured to transmit the mapped information to the 3D printer to be printed.

In another example system, the object formation processor is further configured to generate a 3D model for printing the object of interest as a raised-contoured surface, configured to generate a 3D model for printing said object of interest as a freestanding figurine on a platform, or configured to generate a 3D model for printing a person depicted in the plurality of video frames. The object formation processor can be further configured to break the 3D wire-frame model into 3D components, configured to determine the position of the 3D components in relation with respect to the plurality of video frames representing said delineated object, and/or configured to color the 3D components with the color information from the plurality of video frames representing said delineated object.

Another example of a system may include a multiple frame abstraction processor configured to calculate the 3D wire-frame model from the plurality of video frames, and the source of the plurality of video frames is a stereoscopic video.

Also in another example the system may include a database with 3D wire-frames with copyright protection information for each 3D wire-frame.

BRIEF DESCRIPTION OF THE DRAWINGS

A more complete appreciation of embodiments of the invention, and many of the attendant advantages thereof, will be readily apparent as the same becomes better understood by reference to the following detailed description when considered in conjunction with the accompanying drawing in which like reference symbols indicate the same or similar components, wherein.

DETAILED DESCRIPTION OF CERTAIN EMBODIMENTS

The following detailed description is directed to certain specific embodiments. However, other embodiments may be used and some elements can be embodied in a multitude of different ways.

As an initial matter, terminologies to be used to describe example embodiments are provided below as best they can be expressed because various concepts herein are novel and well known terminologies may not yet exist. Moreover, the description should not be interpreted as being limited to only technologies and concepts described herein because the purpose of the description provided herein is for conveying concepts relating to example embodiments of the present invention and is not limited only to example descriptions.

User interface enabled video devices (UIEVDs) are electronic devices that can display video and allow users to point and click on a portion or portions of displayed video or pictures. Examples of such devices are: TV, IPOD, IPHONE, etc.

A three-dimensional model (3D model) is a mathematical and/or numerical representation of a 3D object. An example of 3D model format is described in DXF Reference Guide for AutoCAD 2009 available on the AutoDesk website (http://usa.autodesk.com). A wire-frame 3D model contains information relating to the item of interest which could include the object itself, secondary items in the scene, and background attributes. A 3D model can also include information relating to the surface color of the object as well as information relating to the pose of the object to be printed. Moreover, information such as surface texture, illumination properties, and geometry topology is optionally included in the 3D model. Such a 3D model is referred to as a full 3D model herein.

Figure 1:
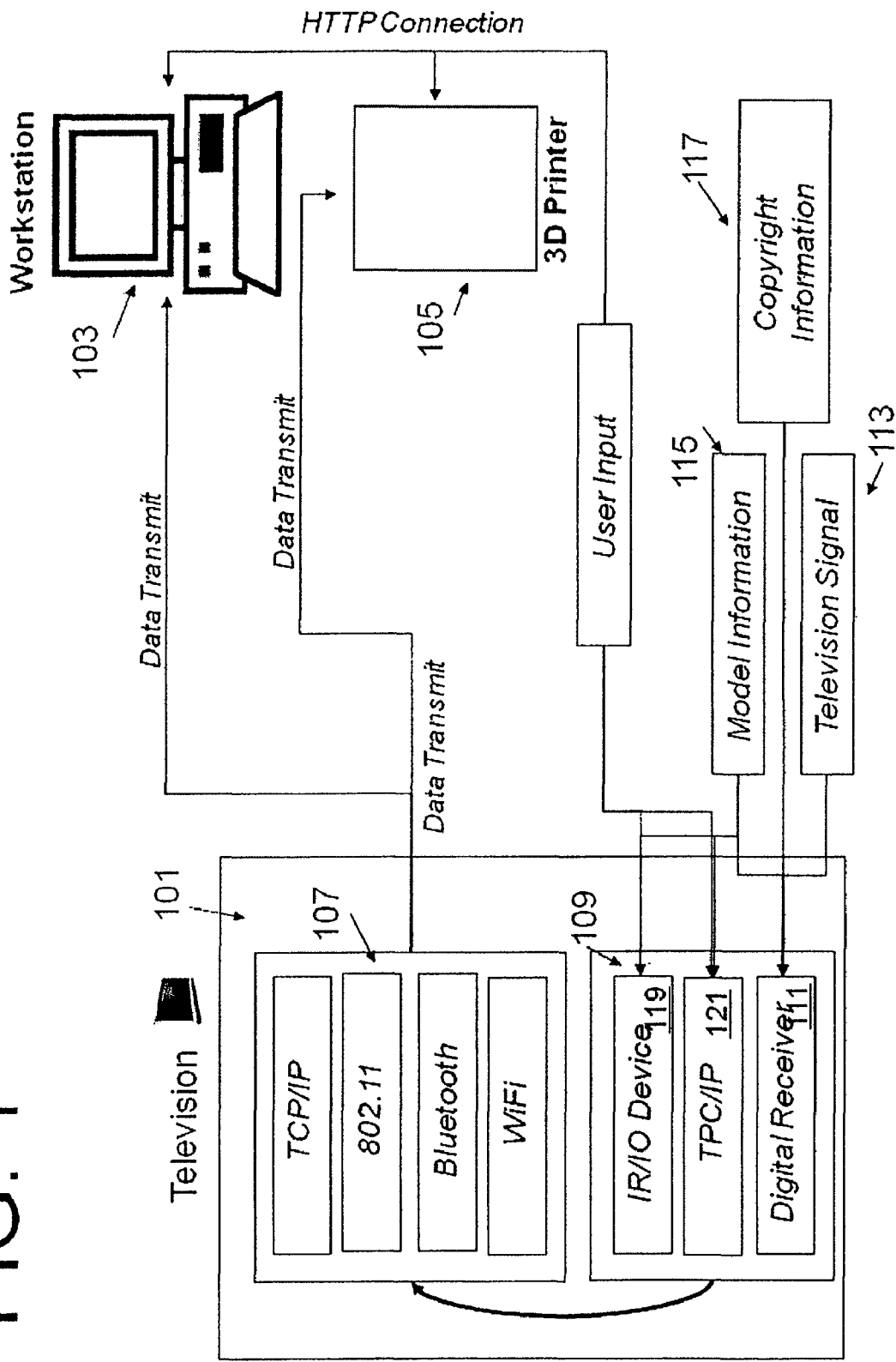
FIG. 1 is a block diagram illustrating an overall interface scheme of an example embodiment.

FIG. 1 illustrates an example embodiment of an overall interface scheme, which can include a television (TV) 101, a workstation 103, and a 3D printer 105. As used herein, "TV" is a broad term that refers to an image display device coupled with certain circuitry to receive and display data. The TV 101 exemplifies both TV's having the display and said circuitry housed together in a single unit as well as TV's having a display housed separately from one or more portions of said circuitry. In some examples, such circuitry is configured in one or more separate components that can be purchased or obtained separately from the TV 101, and that are connected to communicate with the TV 101.

In the embodiment illustrated in FIG. 1, TV 101 includes internal circuitry such as data interface unit 107 and data receiver unit 109. Data interface unit 107 in turn can include one or more communication modules that communicate using one or more wired or wireless communication protocols, for example, TCP/IP, 802.11, Bluetooth, and/or WiFi. The data receiver unit 109 can include one or more devices to receive data, for example, model information, television or broadcast signals, and other information including copyright information. In this embodiment, data receiver unit 109 includes a digital receiver 111 configured to receive digital data such as TV signal 113, 3D model information 115, and other information that is associated with the received digital data, for example, copyright information 117. Model information 115 can also be received by the data receiver unit 109 using TCP/IP (or equivalent Internet protocol) 121. Data receiver unit 109 can also include an input device to receive user input by including an IR/IO device 119 and/or a device configured to communicate using the TCP/IP communication protocol 121. TV 101 is configured to communicate with workstation 103 and 3D printer 105 over communication links.

In some embodiments, the 3D printer 105 is co-located with the TV 101 and the user such that the user can simply remove a printed item from the 3D printer. In other embodiments, the 3D printer 105 is located at a place remote from the user. Once the item is printed, the user may pick-up the printed 3D item at the remote location, or have the 3D item shipped or transferred to the user's location. For example, a relatively inexpensive 3D printer 105 may be located in a user's home; alternatively, a high-end 3D printer 105 may be located at a printing kiosk or other business that provides high quality 3D printing services for numerous customers/users.

Figure 2:
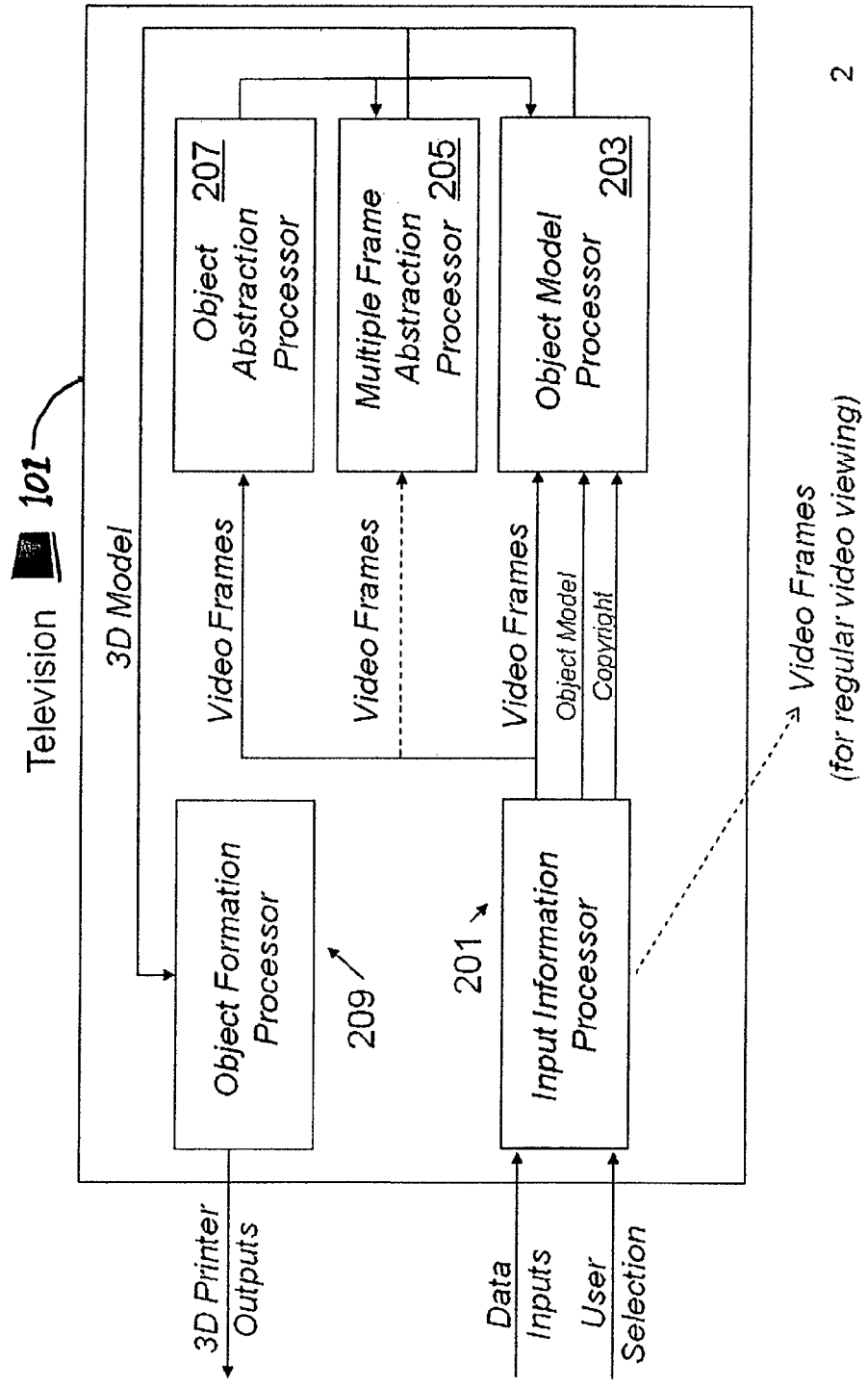
FIG. 2 is a block diagram illustrating data processing techniques within a television in an example embodiment.

FIG. 2 illustrates an embodiment showing some of the data processing techniques that can be configured within the TV 101, for example, in software or hardware. In some embodiments, the data processing techniques are configured on one or both of the data interface unit 107 or the data receiver unit 109. In other embodiments, the data processing techniques are configured on components located outside of the TV 101 housing and that communicate with the TV 101. In the embodiment illustrated in FIG. 2, the TV 101 includes input information processor 201, which is configured to receive TV signals. In some embodiments, the input processor 201 is implemented in data receiver unit 109 (FIG. 1). The TV signal can be a conventional analog signal or digital signal from broadcasters which can be transmitted over air, cable, or satellite. Input information processor 201 processes the received TV signal and converts it into video frames, which can be conjugated stereoscopic image frames in some embodiments. The TV signal path can also be used to download a 3D model. The TV signal path can also be used to download copyright information associated with the 3D model if such information is available. Input information processor 201 *c* an also receive user selection information, indicating which object within the video frames the user desires to be printed by the 3D printer. In one example, a user can select a person(s) in an image or select another other object (for example, a sport figure or a child).

TV 101 also includes an object model processor 203 configured to calculate a printable 3D model with color and pose information based on the received wire-frame 3D model, video frames (includes main subject and background), and user selection information. A multiple frame abstraction processor 205 is configured to calculate the 3D model based on the video captured frames. In some embodiments, the multiple frame abstraction processor 205 calculates the 3D model based solely on the video capture frames. An object abstraction processor 207 is configured to delineate the item of interest in the video frame(s) that will be used to generate the printable 3D model. The results from the object abstraction processor 207 can be provided (directly or indirectly) to both the object model processor 203 and the multiple frame abstraction processor 205. An Object Formation Processor 209 integrates the results from 203 and 205 into a readable format for most common 3D printers. The generated 3D model with color and pose information is then sent to 3D printer 105. In some cases, the printer can be attached to a host device such as workstation 103 in FIG. 1. It should be noted that the Object Formation Processor 209 can also compensate for in-scene motion of the object of interest, for camera motion of the object of interest, and/or for color imbalances of the object of interest.

In particular, the object formation processor 209 generate a 3D model for printing the object of interest as a raised-contoured surface, a 3D model for printing the object of interest as a freestanding figurine on a platform, and/or a 3D model for printing a person depicted in the plurality of video frames. The object formation processor 209 can also break the 3D wire-frame model into 3D components, determine the position of the 3D components in relation with respect to the plurality of video frames representing the delineated object, and color the 3D components with the color information from the plurality of video frames representing the delineated object.

Figure 3:
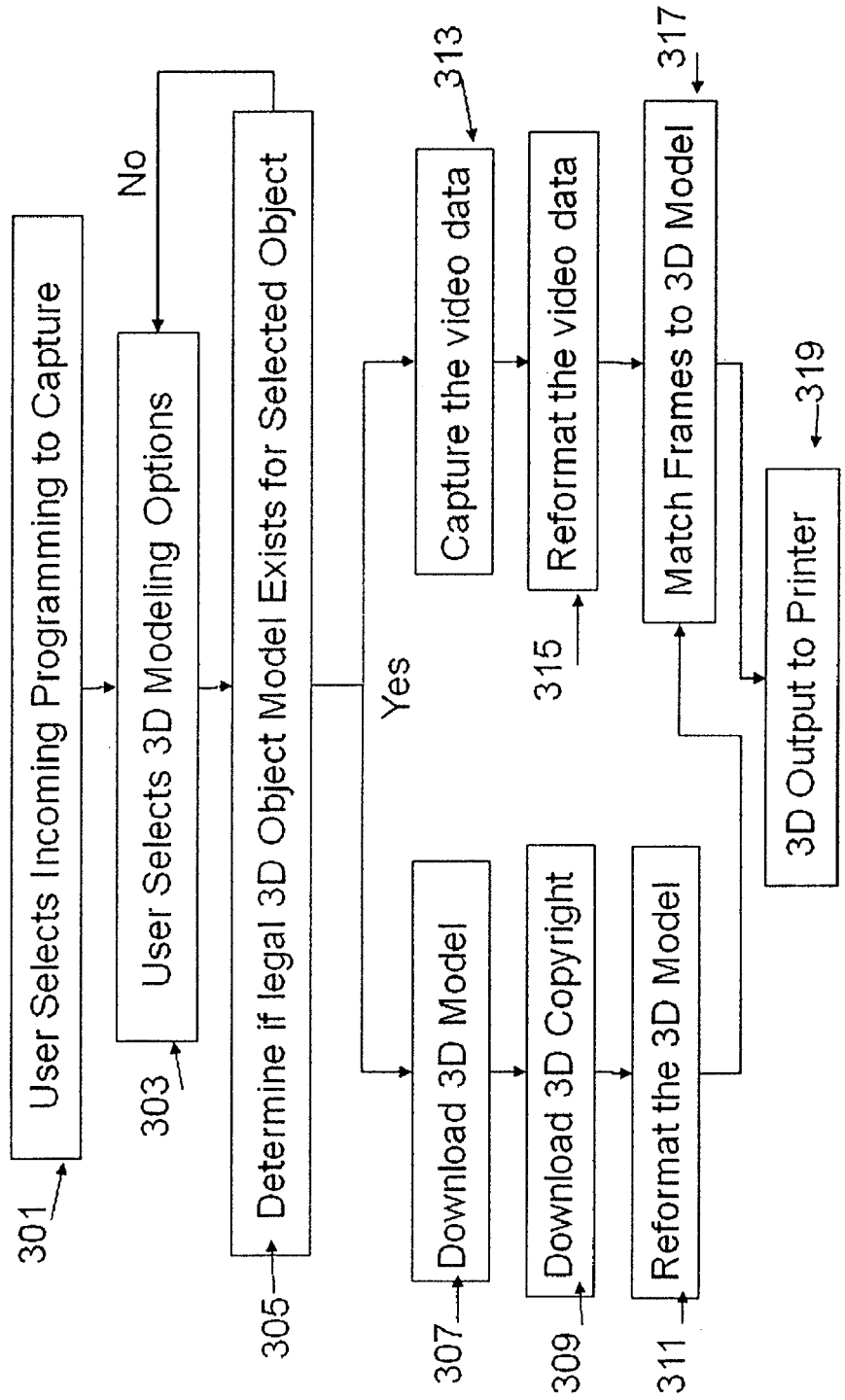
FIG. 3 is a flow chart illustrating data processing techniques to generate a 3D model, including surface color and pose information, from at least video data and a wire-frame 3D model in some example embodiments.

Using various example components described above in connection with FIGS. 1 and 2, data processing techniques to generate a 3D model including surface color and pose information is described by referring to FIG. 3. While viewing a TV program such as sports program (e.g., baseball, football, golf, basketball, etc.) or such as movies, a user may be interested in printing a figurine of a particular pose by a player (for example, a baseball player catching a ball or a golf player swinging a driver). In such an instance, a user can freeze the frame and select the portion of the image frame (for example, the ball player) to be printed in a 3D printer. In other words, a user selects incoming programming (or whatever video is being viewed) to capture (step 301) an image of player that the user is interested in printing.

After allowing the user to select a portion of the framed image, at step 303 the example embodiment is configured to allow the user to select a wire-frame 3D model of the player. Such a wire-frame 3D model of a particular player may include 3D wire frame skeletons, generic skins, texture maps, attributes (e.g. predetermined colors), and lighting constraints. Moreover, the model may contain the physical limitation of the item of interest (e.g. physical flexibility, etc.). In an example embodiment of the present invention, a user is allowed to access a database with numerous 3D models of various individuals. The user can then match the image that he/she selected to the 3D model of the same individual from the database.

Figure 4:
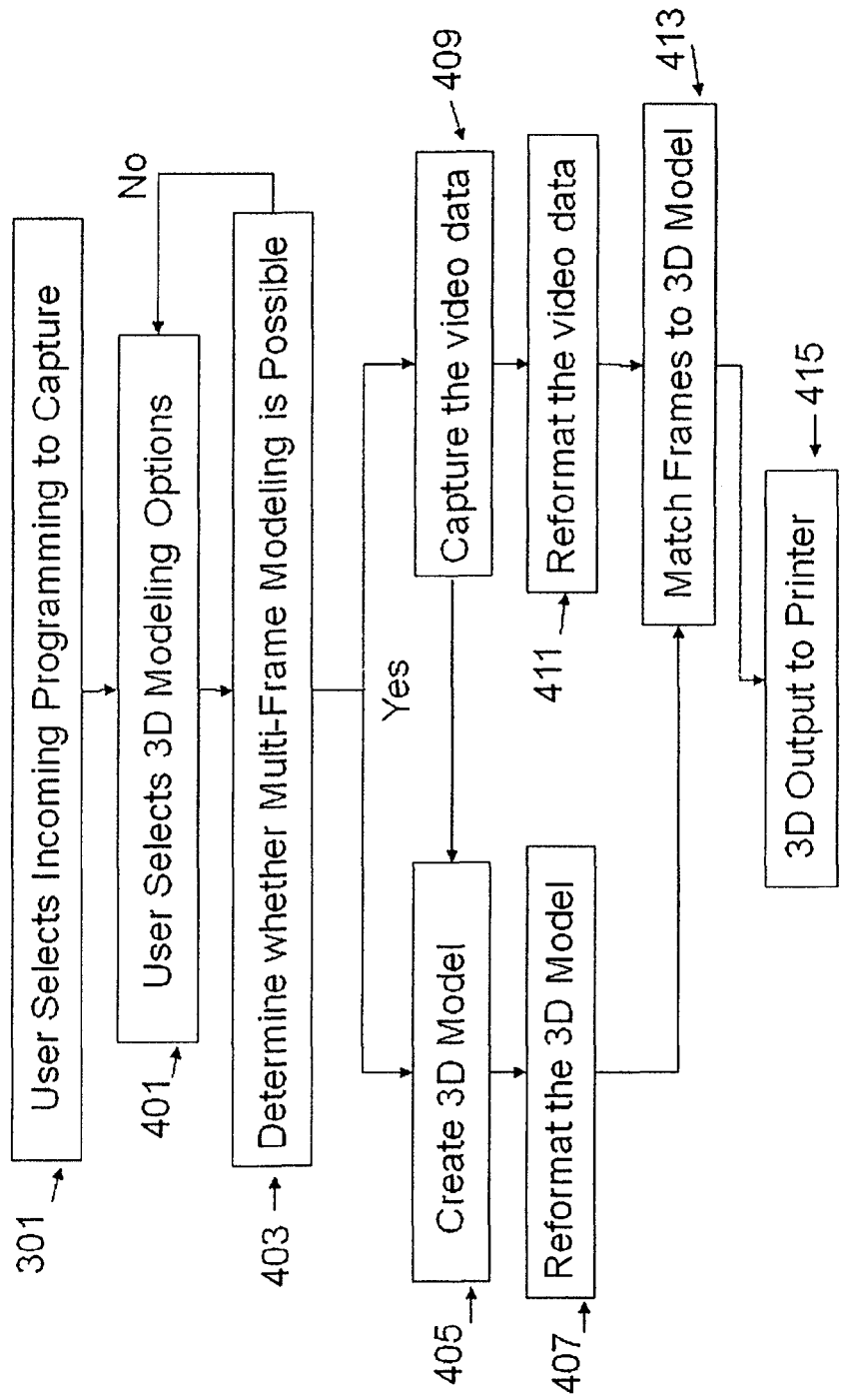
FIG. 4 is a flow chart illustrating data processing techniques to generate a 3D model including surface color and pose information from stereoscopic images generated from multi-frame images according to an example embodiment.

In one embodiment, accessing the database with wire-frame 3D models can be free of charge, or accessing the database can be a fee based service. If a fee based service is provided, before the requested 3D model is download, whether such service can be provided or not is checked. In other words, in some embodiments, the data processing functionality determines whether it is legal to download a 3D model (step 305) (for example, if previous usage permissions have been granted). If it is legal, the selected 3D model can be downloaded (step 307), and 3D copyright information can also be downloaded (step 309). To conform to intellectual property requirements that may be associated with the printed product, the 3D copyright and/or trademark information can be downloaded to be displayed as part of the printed product. The 3D copyright material may be added to the printable 3D product to ensure compliance with trademark restrictions. In parallel or in sequence, in the example embodiment, the video frame that contains the user selected portion is captured (step 313) and then reformatted (step 315) into an optimal format for performing frame matching. The reformatted image data is then matched with the downloaded 3D model, and the result is sent to 3D printer 105 (step 319), or stored to be printed later. For example, a user may store a number of 3D objects and at a later time print one or more of the 3D objects on a high-end 3D printer at a remote location from the user, for example, at a company or 3D printing kiosk that uses a high-end 3D printer to print a variety of 3D objects commercially. The user then may pickup the one or more objects at the remote location or have the 3D objects shipped from the remote location to the user. It should be noted that the image can be compensated for in-scene motion of the object of interest, for camera motion of the object of interest, and/or for color imbalances of the object of interest FIG. 4 is a flow chart illustrating data processing techniques to generate a 3D model including surface color and pose information from stereoscopic images generated from multi-frame images of an example embodiment of the present invention. In this example embodiment, the database with wire-frame 3D models is not available or not accessible. In such an embodiment, a 3D model can be generated using multiple frames. For instance, a 3D model can be generated from a pair of stereoscopic images. These data processing techniques can be performed by, for example, the systems illustrated in FIGS. 1 and 2.

Based on different number of frames and various perspectives of frames, different levels of 3D models can be generated. For instance, multiple images taken of a 3D item of interest can be used to create a 3D model of the item. Given that all the surface area of the item of interest can be imaged, a complete 3D model of the item of interest can be derived. Depending on the geometry of the item of interest, it is possible to perform a valid representation with a small number of video frames (e.g. 6). A multi-lighted, multi-angle 3D model generation system was developed by Adam Baumberg from the Canon Research Centre Europe that faithfully restored a complete 3D model from 20-25 frames. The system is described in "*Blending images for texturing 3D.*" Adam Baumberg, Canon Research Centre Europe, which is incorporated by reference herein in its entirety. Additionally, an algorithm is described in U.S. Pat. No. 6,856,314, called "Method and system for 3D reconstruction of multiple views with altering search path and occlusion modeling," (for example, at column 4, line 55 through column 5, line 10 and as illustrated by the referenced figures) to perform full 3D model reconstruction from a limited number of images, which is incorporated by reference herein in its entirety.

With a complete 3D model, a fully developed 3D object can be printed using a 3D printer. However, the present invention also contemplates creating other types of models that are less than a complete 3D model depending upon the availability of relevant information and/or the user preference. For instance, a 3D model that represents a raised flat surface can be generated from two stereoscopic images. The raised surface can be a stepped up surface, as compared with the surrounding surface, and can be outlined by the contour of an object selected by the user. As an example, if a person is selected by the user in the video scene, the contour of that person in the image would be raised using multiple views to create the 3D perspective. This type of 3D model is referred to as a 2.5 dimension model within this document for the sake of convenience.

In another example, two stereoscopic images can be used to generate 3D models to create raised relief of the object of interest. An example of such a 3D model is a relief map. This type of 3D model is referred to as a 3D relief model within this document for the sake of convenience. A difference between a 3D relief model and a 2.5 dimensional model is that the raised surface of a 2.5 dimensional model would be flat no matter what the object of interest actually looks like; whereas, the raised surface of a 3D relief model would show a 3 dimensional surface.

Now referring back to FIG. 4, in step 401, the user selects 3D modeling options to include either 2.5 dimensional, 3D relief, or full 3D. In step 403, an example embodiment of the present invention determines whether the 3D option selected by the user can be generated based on the available frames. Such an algorithm is described in U.S. Pat. No. 6,856,314 (for example, in the specification at column 4, line 55 through column 5, line 10, and as illustrated by the referenced figures). In step 405, the example embodiment of the present invention creates a 3D model based on the user preference. In step 407, the created 3D model is reformatted into a 3D model that aligns with the processing performed in FIG. 3.

Figure 5:
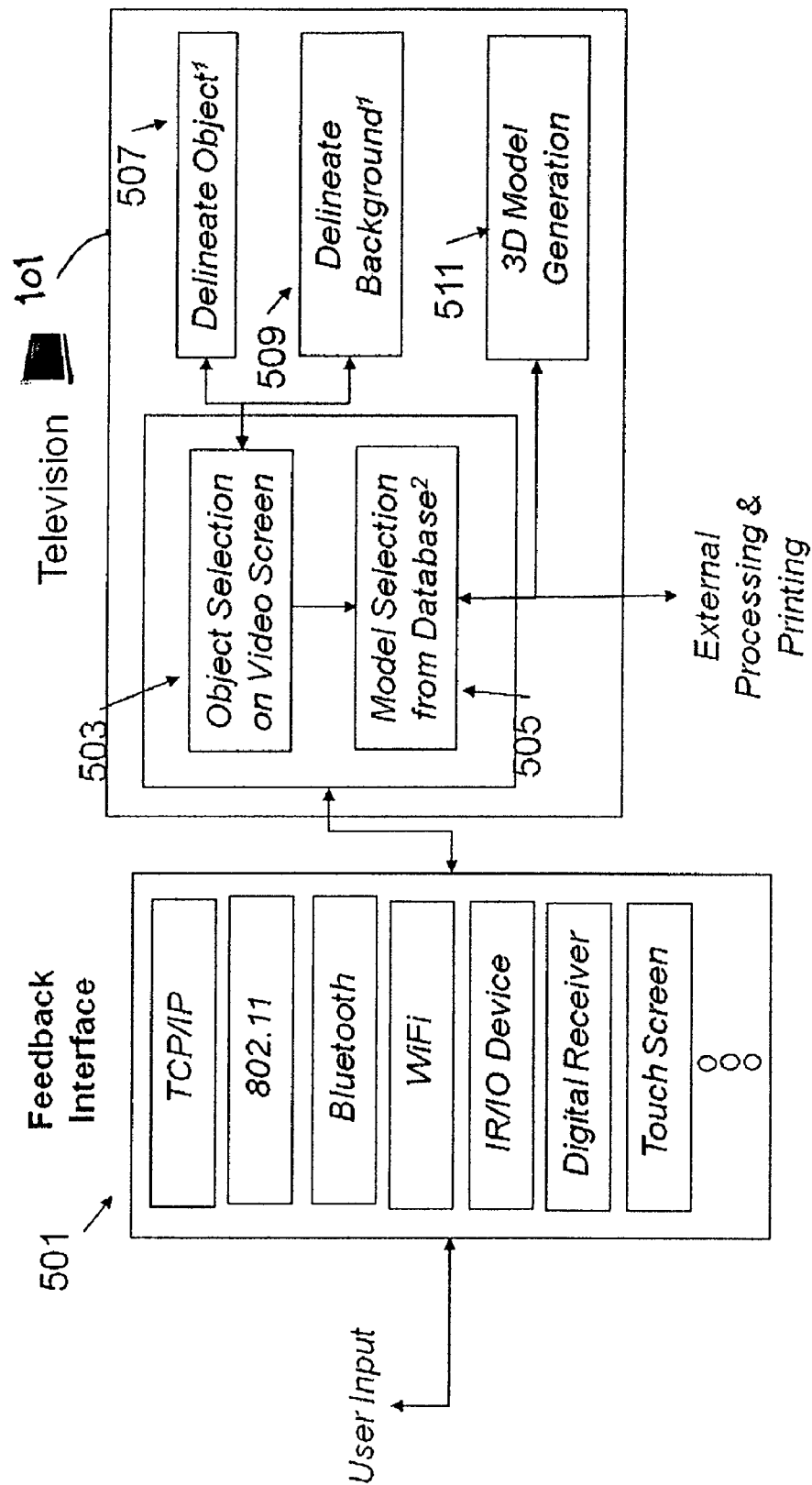
FIG. 5 is a block diagram illustrating feedback connectivity with a user and a television for generating a 3D model according to an example embodiment.

FIG. 5 is a block diagram illustrating feedback connectivity with a user and a television for generating a 3D model according to an example embodiment. FIG. 5 illustrates the interaction between the user and the TV 101. In this example, a feedback interface 501 can be one or any combination of devices using protocols such as TCP/IP, 802.11, Bluetooth, or WiFi. The interface device itself can be an IR/IO device, digital receiver, or touch screen. Through the feedback interface, the user can designate the item of interest on the TV 101. TV 101 may include an object selection processor 503 and model selection processor 505. The object selection processor 503 can be configured to perform two data processing functions, delineating object 507 and delineating background 509. The model selection processor provides the 3D model from the external database to 3D model generation 511 using either user inputs through the feedback interface or externally pre-processed information. During the delineating object step 507, the item selected by the user on the image is delineated. During the delineating background step 509, the rest of image minus the object selected by the user is delineated. Delineation may be performed automatically or semi-automatically, for example, during an interactive delineation process with the user. Some examples of delineation algorithms that may be implemented are found in the following three publications:

F. Leymarie and M. D. Levine, "Tracking deformable objects in the plane using an active contour model." *IEEE Transactions on Pattern Analysis and Machine Intelligence*. v. 15, n. 6, pp. 617-634, 1993.

K.-M. Lam and H. Yan, "Fast greedy algorithm for active contours." *Electronics Letters*. v. 30, n. 1, pp. 21-23, 1994.

*Active Contours The Application of Techniques from Graphics, Vision, Control Theory and Statistics to Visual Tracking of Shapes in Motion* by Andrew Blake ISBN-10: 3540762175 ISBN-13: 978-3540762171

Figure 6:
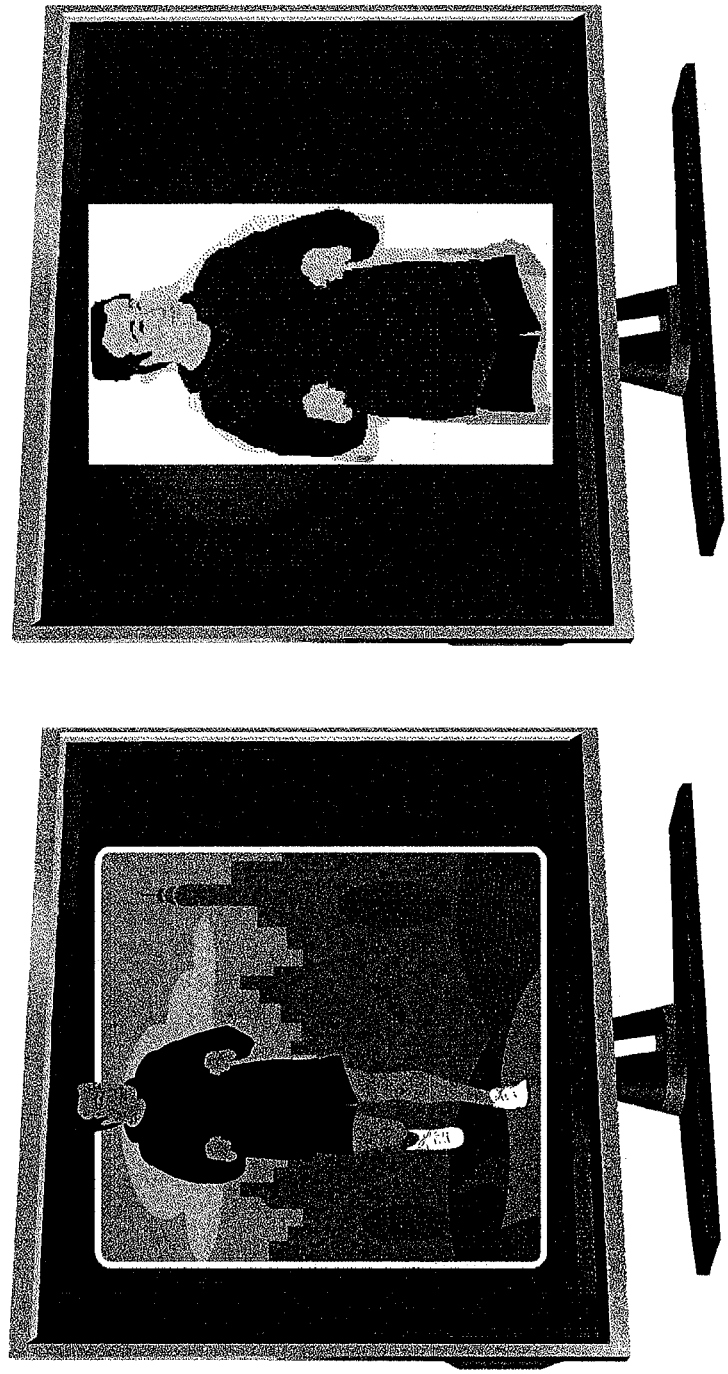
FIG. 6 is an illustration depicting steps of selecting an object of interest.

All three publications identified above are incorporated reference herein in their entirety. Other delineation methods and algorithms may also be used. FIG. 6 graphically illustrates the output of the delineation steps in accordance with some embodiments.

The result of delineated object from the image can then be combined with (or mapped to) a wire-frame 3D model selected by the user to form a full 3D model which information relating to the surface colors and pose of the object to be printed. The 3D wire-frame model is combined with the captured image in a multi-step process. The following list describes the steps in some embodiments of the process:

Break the wire-frame 3D model into 3D wire-model components that can be matched directly with the capture video frames. For example, 3D wire-model components of a sports figure can be the head, arms, torso, legs, and feet.

Determine the position of the each 3D component in the scenes of the captured video frames:

For a given 3D wire-frame component, determine constraints imposed by other 3D wire-frame components placed in the scene. In the example of a sports figure, if the torso is placed first, the search area and viable search location (for example, position, orientation) for the head is limited to a small area. Once the head is placed, the arms, legs and feet can also be placed.

For a given 3D wire-frame component, create multiple simulated 2D images from the 3D wire-frame model at various orientations (e.g., view points) as constrained by the previous step. The simulated 2D images can be created using a generic illumination model in order to robustly match the created image with the captured image. In other examples, illumination models that match the actual scene (for example, rainy day, dusk, bright sunny day with shadows, or the like) can also be used.

For a given 3D component, determine the position and orientation thereof using Principal Component Analysis (PCA). The principal component analysis (Karhunen-Loeve transform) is a linear transformation for a sample in n-dimensional space which makes the new coordinate axes uncorrelated. Using PCA, the individual 3D wire-frame component that is projected into a simulated 2D image is aligned with the 2D capture images extracted from the captured frames. An approximation to the Karhunen-Loeve transform is discussed in "*Fast Approximate Karhunen-Loeve Transform with Applications to Digital Image Coding*," Leu-Shing Lan and Irving Reed, University of Southern California, Proc SPIE Vol. 2094, 1993, which is incorporated by reference in its entirety.

Optimize on a global connection distance metric that ensures all the 3D wire-frame components re-connect to the original 3D wire-frame model at the proper locations. If the model does not re-connect properly, as specified by a user threshold, the process can be re-iterated by discarding the largest incorrect correspondence and re-calculating the system of simulated 2D images and 3D wire-frame components.

Finally, the image may be textured onto (for example, fill in with colors) the full 3D model. The 3D wire-frame model is simplified into a triangular mesh. Since the position and orientation of the 3D wire-frame model relative to the 2D captured frame(s) are calculated in the steps described above, the delineated image is projected onto the triangular mesh of the 3D wire-frame model. Three different visibility states that can be considered when performing the mapping from the 2D captured image onto the 3D wire-frame model to include:

Visible: If a triangle of the 3D wire-frame model is completely visible in the camera view, the whole triangle can be textured based on the color information of the delineated image.

Hidden: If a triangle is completely hidden in the camera view, the triangle can be rendered with zero intensity or filled in with information from another part of the model (for example, opposite side) based on the user's preferences.

Partially visible: The triangles may be subdivided into smaller triangles that are hidden or visible. Then the appropriate action can be taken from the above steps and the model may be textured.

The resulting 3D model is textured with color and shadow and displayed in the appropriate pose, which is referred to as the full 3D model. At this point, the object of interest is ready to be printed. Note that the mapping can be achieved (and/or improved) if multiple frames or multiple cameras at different angles are used to during the coloring step. In other words, using multiple frames or multiple cameras at different angles, the front and back of an object to be printed can be colored in assuming that the frames captured the front and back of the object to be printed.

Figure 7:
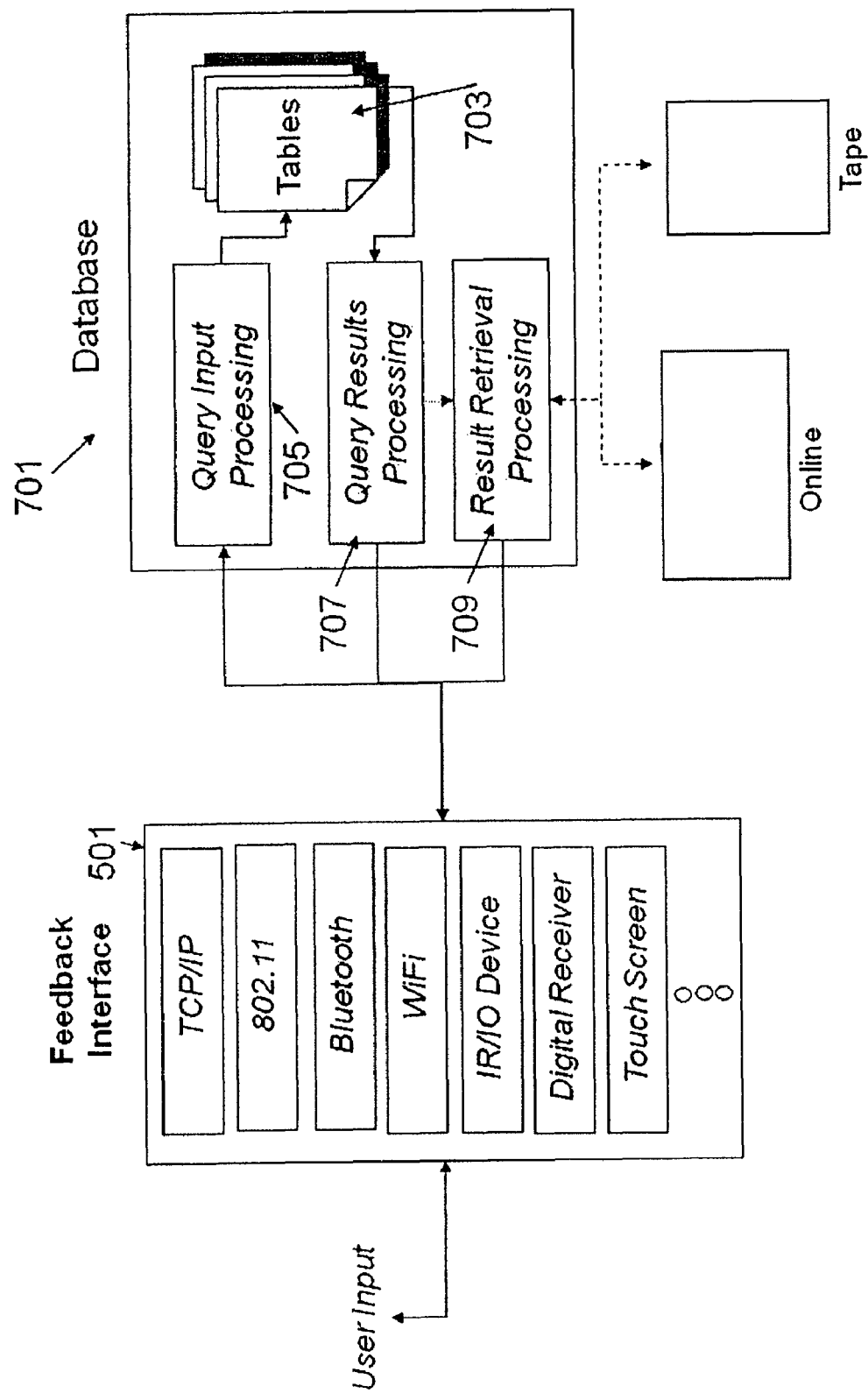
FIG. 7 is a block diagram illustrating selecting a wire-frame 3D model from a database of wire-frame 3D models.
Figure 8:
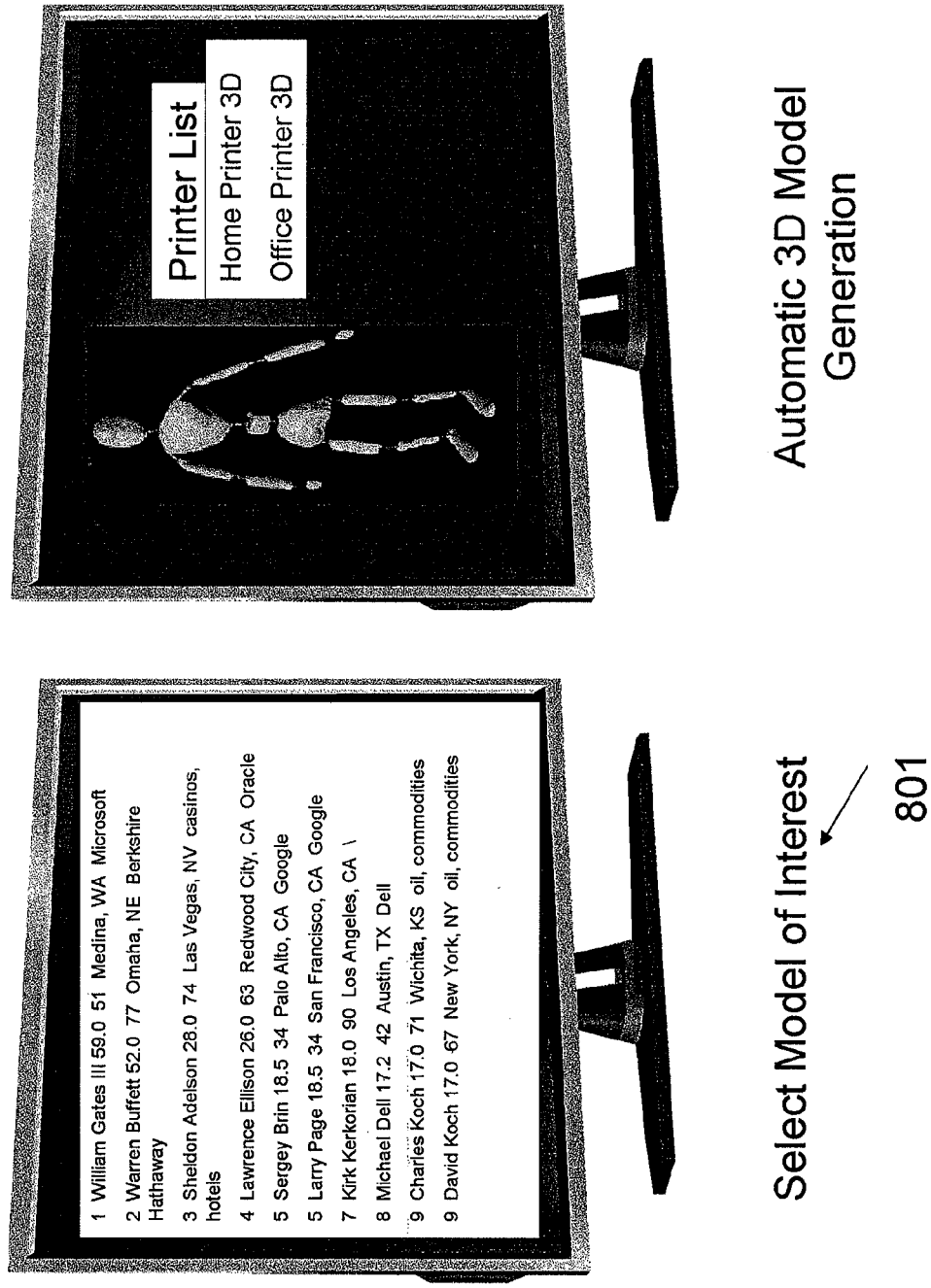
FIG. 8 illustrates an example of selecting a 3D model of interest and selecting a 3D printer.

In FIG. 7, a database 701 of wire-frame 3D models is illustrated as being able to communicate with the user via feedback interface 501. Database 701 includes tables 703 that contain 3D models of objects. For instance, a set of tables could contain number of 3D models of movie actors and actresses; another set of tables could contain number of 3D models of football players, and etc. A user using feedback interface 501 can send a query request to database 701 asking for a list of 3D models in tables 703 for a specific category of objects (or persons). Such a query is processed database 701 and a responsive list is generated in query results processing step 707 and result retrieval processing step 709. The resulting list is sent back to TV 101 to be displayed. An example list 801 is shown in FIG. 8.

In any of the methods and processes specifically described above, one or more steps may be added, or a described step deleted, without departing from at least one of the aspects of the invention. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some embodiments, the functionality of devices described herein as separate processors may be combined into an embodiment using fewer processors, or a single processor, unless otherwise described.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

Various modifications to these example embodiments may be readily apparent to those skilled in the art, and the generic principles defined herein may be applied to other examples without departing from the spirit or scope of the novel aspects described herein. Thus, the scope of the disclosure is not intended to be limited to the examples shown herein but is to be accorded the widest scope consistent with the principles and novel features disclosed herein.

What is claimed is:

1. A method of printing a three-dimensional (3D) object in a 3D printer, the method comprising:
causing a selection of a point in an object of interest in an image;
automatically delineating the object of interest in the image;
selecting a wire-frame 3D model of the object of interest, wherein the wire-frame 3D model includes shape information of the object of interest;
breaking the 3D wire-frame model into 3D components;
determining the position of the 3D components in relation with respect to the image representing said delineated object;
coloring the 3D components with the color information from the image representing said delineated object;
mapping information from a portion of the image representing said delineated object with the selected wire-frame 3D model; and
transmitting the mapped information to a 3D printer to be printed.

2. The method of claim 1, wherein the mapped information is a 3D model for printing the object of interest as a raised-contoured surface.

3. The method of claim 1, wherein the mapped information is a 3D model for printing said object of interest as a freestanding figurine on a platform.

4. The method of claim 1, wherein the object of interest is an image of a person depicted in an image.

5. The method of claim 1, further comprising the step of automatically calculating the 3D wire-frame model from a stereoscopic set of images.

6. The method of claim 1, further comprising the step of storing the 3D wire-frame in a database with a copyright protection.

7. The method of claim 6, further comprises the step of compensating for in-scene motion of the object of interest.

8. The method of claim 6, further comprises the step of compensating for camera motion of the object of interest.

9. The method of claim 6, further comprises the step of compensating for color imbalances of the object of interest.

10. A system for printing three dimensional images comprising:
    an input information processor configured to receive a plurality of video frames and information relating to a selection of a point in an object of interest in said plurality of video frames;
    an object model processor configured to receive a wire-frame 3D model of the object of interest, wherein the wire-frame 3D model includes shape information of the object of interest;
    an object abstraction processor configured to automatically delineate the object of interest; and
    an object formation processor configured to break the 3D wire-frame model into 3D components, and further configured to map information from a portion of an image representing said delineated object with the selected wire-frame 3D model and to transmit the mapped information to the 3D printer to be printed.

11. The system of claim 10, wherein the object formation processor is further configured to generate a 3D model for printing the object of interest as a raised-contoured surface.

12. The system of claim 10, wherein the object formation processor is further configured to generate a 3D model for printing said object of interest as a freestanding figurine on a platform.

13. The system of claim 12, wherein the object formation processor is further configured to generate a 3D model for printing a person depicted in the plurality of video frames.

14. The system of claim 10 further comprising:
    a multiple frame abstraction processor configured to calculate the 3D wire-frame model from the plurality of video frames.

15. The system of claim 14, wherein the source of the plurality of video frames is a stereoscopic video.

16. The system of claim 10 further comprising a database with 3D wire-frames with copyright protection information for each 3D wire-frame.

17. The system of claim 10, wherein the object formation processor is further configured to determine the position of the 3D components in relation with respect to the plurality of video frames representing said delineated object.

18. The system of claim 10, wherein the object formation processor is further configured to color the 3D components with the color information from the plurality of video frames representing said delineated object.

* * * * *